(12) United States Patent
Yano et al.

(10) Patent No.: US 6,585,386 B1
(45) Date of Patent: *Jul. 1, 2003

(54) LIGHT PIPE, SURFACE LIGHT SOURCE DEVICE AND REFLECTION TYPE LIQUID-CRYSTAL DISPLAY DEVICE

(75) Inventors: Shuuji Yano, Osaka (JP); Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/673,368

(22) PCT Filed: Apr. 13, 1999

(86) PCT No.: PCT/JP99/01963

§ 371 (c)(1),
(2), (4) Date: Oct. 16, 2000

(87) PCT Pub. No.: WO99/53370

PCT Pub. Date: Oct. 21, 1999

(30) Foreign Application Priority Data

Apr. 14, 1998 (JP) .............................. 10-121762

(51) Int. Cl.[7] .............................................. F21V 8/00
(52) U.S. Cl. ........................................................ 362/31
(58) Field of Search ........................................... 362/31

(56) References Cited

U.S. PATENT DOCUMENTS

| 4,212,048 A | | 7/1980 | Castleberry | 362/19 |
| 5,914,760 A | * | 6/1999 | Daiku | 362/31 X |
| 6,108,059 A | * | 8/2000 | Yang | 362/31 X |
| 6,151,089 A | * | 11/2000 | Yang et al. | 362/31 X |
| 6,196,692 B1 | * | 3/2001 | Umemoto et al. | 362/31 X |
| 6,199,995 B1 | * | 3/2001 | Umemoto et al. | 362/31 |

FOREIGN PATENT DOCUMENTS

| JP | 57-144581 | 9/1982 | G09F/9/00 |
| JP | 4-356014 | 12/1992 | G02F/1/1335 |
| JP | 5-158033 | 6/1993 | G02F/1/1335 |
| JP | 5-158034 | 6/1993 | G02F/1/1335 |

OTHER PUBLICATIONS

International Search Report.

* cited by examiner

*Primary Examiner*—Laura K. Tso
(74) *Attorney, Agent, or Firm*—Sughrue Mion, PLLC

(57) ABSTRACT

A light pipe in which light incident on an incident side surface (13) is outputted from a lower surface (12) through a light output means formed on an upper surface (11), the direction of the largest intensity of the light outputted from the lower surface is within an angle of 30 degrees to a normal line with respect to a reference plane of the lower surface, the largest intensity of light leaking from the upper surface in the direction within the angle of 30 degrees is not higher than 1/5 as high as the largest intensity at the lower surface, and the light pipe has a hard coat layer-on the upper surface so that light incident on the lower surface is transmitted from the upper surface; a surface light source device having a light source disposed on the incident side surface of the light pipe; and a reflection type liquid-crystal display device having a liquid-crystal cell provided with a reflection layer disposed on the lower surface side of the surface light source.

10 Claims, 4 Drawing Sheets

LIGHT PIPE, SURFACE LIGHT SOURCE DEVICE AND REFLECTION TYPE LIQUID-CRYSTAL DISPLAY DEVICE

TECHNICAL FIELD

The present invention relates to a light pipe adapted to form a reflection type liquid-crystal display device which is bright and easy to see, and a surface light source device which uses the light pipe and which is excellent in effective utilizing efficiency of light.

BACKGROUND ART

An illumination device permitting a reflection type liquid-crystal display device to be viewed in a dark place, or the like, has been required. In the meantime, the inventors of the present invention have tried to use a front-lighting system in which a back-lighting unit used in a transmission type liquid-crystal display device is disposed on the visual side of a liquid-crystal cell. Such a back-lighting unit uses a light pipe for outputting light incident on its side surface from one of its upper and lower surfaces through a light output means. In the front-lighting system, display contents are recognized visually through the light pipe.

In the back-lighting unit using the background-art light pipe, there was, however, a problem that it was difficult to put the back-lighting unit into practical use because of occurrence of shortage of contrast in the on-state of the back-lighting unit and occurrence of shortage of brightness, disorder of display, etc. in the off-state of the back-lighting unit. Incidentally, in a back-lighting unit using a light pipe having diffusing dots or fine irregularities as a light output means, there arose a problem that contrast was short in visual recognition in the on-state of the back-lighting unit whereas contrast and brightness of display were short as well as clarity was short because of remarkable disorder of a display image through the light pipe in visual recognition owing to external light such as room illumination, or the like, in the off-state of the back-lighting unit.

On the other hand, also in a back-lighting unit using a light pipe (JP-A-62-73206) having a stairstep prism structure including inclined surfaces at an inclination angle of 45degrees and flat surfaces at an inclination angle of 0 degrees as a light output means, there arose a problem that contrast and brightness of display were short in visual recognition in the on-state of the back-lighting unit.

Further, in the aforementioned front-lighting system, the light pipe was located as a surface on the visual side. When the surface was injured, the injury caused disorder of a display image in the same manner as in the fine irregularities. Particularly when the light output means in the light pipe was located in the surface and it was injured, leaking light was apt to increase or the light output means was apt to generate a bright or dark portion. Moreover, when the light output means was abraded gradually by wiping-out, or the like, there arose a problem that the light output characteristic of the light output means varied widely.

Therefore, an object of the present invention is to develop a reflection type liquid-crystal display device which is excellent in contrast and brightness of display in visual recognition regardless of on-state and off-state of the lighting unit, which is excellent in clarity because of prevention disorder of a display image through a light pipe and which is excellent in preservation of initial light output characteristic or display characteristic, and develop a light pipe and a surface light source device that can form the reflection type liquid-crystal display device.

DISCLOSURE OF THE INVENTION

According to the present invention, there is provided a light pipe in which: light incident on an incident side surface of said light pipe is outputted from a lower surface of said light pipe through a light output means formed on an upper surface of said light pipe; the direction of the largest intensity of the light outputted from said lower surface is within an angle of 30 degrees to a normal line with respect to a reference plane of said lower surface; the largest intensity of light leaking from said upper surface in the direction within said angle of 30 degrees is not higher than 1/5 as high as said largest intensity of the light outputted from said lower surface; and said light pipe has a hard coat layer on said upper surface so that light incident on said lower surface is transmitted out from said upper surface.

Further, according to the present invention, there is provided a surface light source device in which a light source is disposed on the incident side surface of the above-mentioned light pipe, and there is provided a reflection type liquid-crystal display device in which a liquid-crystal cell provided with a reflection layer is disposed on the lower surface side of the above-mentioned surface light source.

Figure 9:
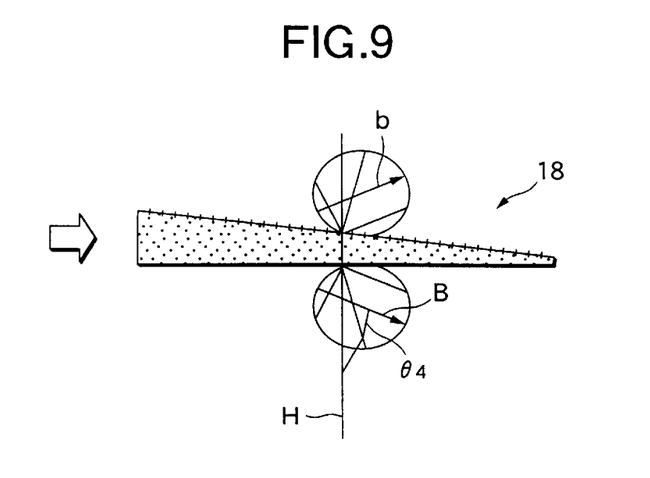
FIG. 9 is a view for explaining output characteristic according to a background-art example.
Figure 10:
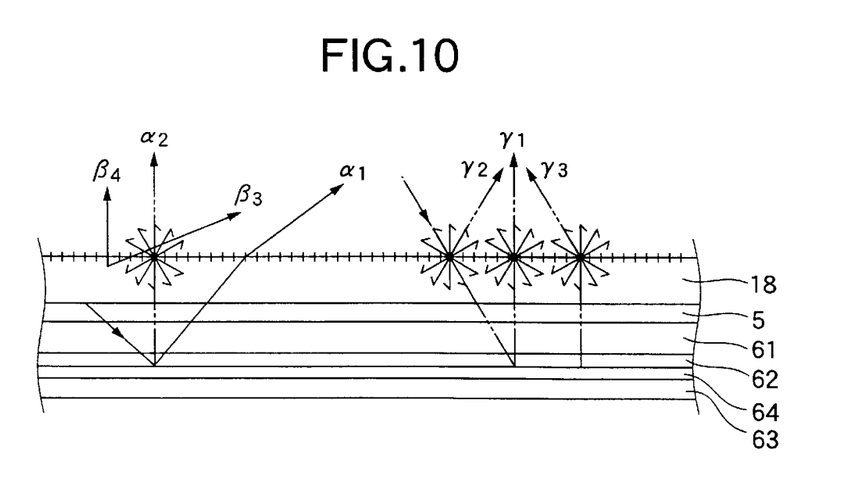
FIG. 10 is a view for explaining a display image according to the background-art example.

The operation and effect of the present invention are based on characteristic given to the light pipe. That is, while the inventors of the present invention have made eagerly investigation and investigation to overcome the aforementioned problems, the following fact has been found. In the background-art light pipe having diffusing dots or fine irregularities as a light output means, transmission light incident on the side surface is scattered by the light output means of the light pipe 18 so as to diverge in almost all directions as shown in FIGS. 9 and 10. The output light $\alpha_1$ from the lower surface and the leaking light $\beta_3$ from the upper surface exhibit the largest strengths B and b in a direction $\theta_4$ at an angle of about 60 degrees to a normal line (frontal direction) H with respect to the lower surface because of the scattering characteristic of the light output means. Because the strengths are approximately equal to each other, the quantity of light is short in a direction effective for visibility, especially in a viewing angle range of from upward 15 degrees to downward 30 degrees vertically and from leftward 30 degrees to rightward 30 degrees horizontally on the basis of the normal line. As a result, brightness of display is short in the viewing angle range. Further, because the output light $\alpha_2$ from the lower surface to form a display image overlaps the leaking light $\beta_4$ from the upper surface, contrast is short. In the off-state of lighting, contrast is short because the display image is white-faded by the scattered light $\gamma_2$ and the display image is disordered remarkably because two kinds of display light $\gamma_1$ and $\gamma_3$ are mixed with each other by scattering owing to the light pipe.

The following fact has been further found. That is, also in the light pipe having the prism type light output means according to JP-A-62-73206, like the aforementioned light pipe, a large amount of light leaks from the upper surface. The leaking light overlaps the output light from the lower surface for forming the display image so that contrast is lowered. Moreover, a large amount of light outputs at a large output angle but the quantity of light in a direction effective for visibility is short to thereby lower brightness of display to cause a problem in lowering of display quality.

Figure 4:
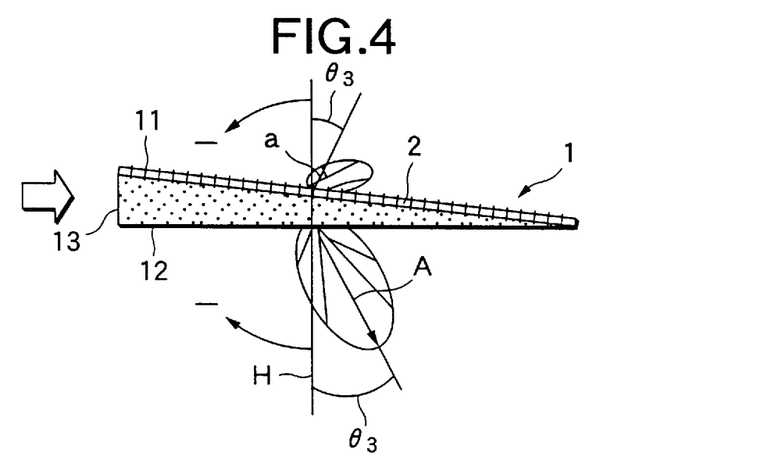
FIG. 4 is a view for explaining output characteristic according to an embodiment.

Therefore, in order to form a bright and clear display image, the light pipe needs to be provided as a light pipe capable of outputting light incident on the side surface from the lower surface with good directivity, especially with good light-condensing characteristic at an angle $\theta_3$ as near to a direction of a normal line H with respect to the lower surface as possible as shown in FIG. 4 and particularly in the aforementioned viewing angle range. In a reflection type liquid-crystal display device, an attempt to achieve uniformity and clarity of display is generally made through a rough surface type reflection layer with a mean diffusion angle in a range of from about 5 to about 15 degrees. Hence, if the quantity of light incident on the reflection layer at a large angle to the reflection layer is large (B in FIG. 9, $\alpha_1$ in FIG. 10), the quantity of light effective for visibility is reduced to thereby make bright display difficult. Moreover, invisibility at such a large angle, reversion of display is apt to occur. In electric field birefringence type display, a problem in occurrence of a large color change etc. is apt to arise.

For improvement of contrast, the leaking light a from the upper surface needs to be prevented as sufficiently from overlapping the output light A from the lower surface to form a display image as possible, as shown in FIG. 4, especially needs to be prevented as sufficiently from overlapping the output light A in the aforementioned viewing angle range as possible. In the reflection type liquid-crystal display device, overlapping of the leaking light and the display image has large influence on the contrast ratio because the contrast ratio is generally in a range of from 1:5 to 1:20.

For prevention of disorder of the display image, light transmitted from the upper surface to the lower surface and from the lower surface to the upper surface needs to be prevented as sufficiently from being scattered as possible. A front-lighting unit provided in the reflection type liquid-crystal display device is an auxiliary light source for making visual recognition in a dark place possible. Hence, the front-lighting unit is adapted to visual recognition using external light such as indoor light or natural light for the original purpose of reduction of consumed electric power. Hence, if incidence of external light is blocked by the light pipe in the original condition that the front-lighting unit is switched off, display becomes dark. If the light is scattered by the light pipe in this condition, lowering of contrast is caused by white-fading of a surface or disorder of a display image is caused by mixture of the display image, or the like.

In addition, from the point of view of preservation of the aforementioned light output characteristic and display quality for a long term, the light pipe, especially the light output means formed on the upper surface of the light pipe, needs to be prevented from being injured and abraded by wiping-out, or the like. The pixel pitch of the liquid-crystal display device is generally in a range of from 100 to 300 $\mu$m. Hence, the influence of the light pipe on transmitted light needs to be suppressed as sufficiently as possible so that information with a pitch of about 100 $\mu$m can be recognized visually clearly. At the same time, moire caused by interference with pixels needs to be also suppressed to obtain good display quality.

BEST MODE FOR CARRYING OUT THE INVENTION

A light pipe according to the present invention is configured as follows. Light incident on its incident side surface is outputted from its lower surface through a light output means formed on its upper surface. The direction of the largest intensity of the light outputted from the lower surface is within an angle of 30 degrees to a normal line with respect to a reference plane of the lower surface. The largest intensity of light leaking from the upper surface in the direction within the angle of 30 degrees is not higher than $\frac{1}{5}$ as high as the largest intensity of the light outputted from the lower surface. The light pipe has a hard coat layer on its upper surface so that light incident on the hard coat layer from the lower surface is transmitted from the upper surface.

Examples of the light pipe according to the present invention are shown in FIG. 1 and FIGS. 2A to 2C. The reference numeral 1 designates a light pipe; 11, 16 or 17, an upper surface having a light output means formed thereon; 12, a lower surface serving as the light output side; 13, an incident side surface; 14, a lateral side surface; and 15, an end opposite to the incident side surface. Further, the reference numeral 2 designates a hard coat layer provided on the upper surface.

The light pipe according to the present invention is provided so that light incident on the incident side surface is outputted from the lower surface through the light output means formed on the upper surface. Generally, the light pipe is made of a plate-like material having an upper surface, a lower surface opposite to the upper surface, and an incident side surface constituted by a side surface between the upper and lower surfaces. The plate-like material may be a plate of uniform thickness, or the like. Preferably, the plate-like material is provided as a plate in which the thickness of the end 15 opposite to the incident side surface 13 is smaller than that of the incident side surface, especially the thickness of the opposite end 15 is not larger than 50% as large as the thickness of the incident side surface.

Figure 1:
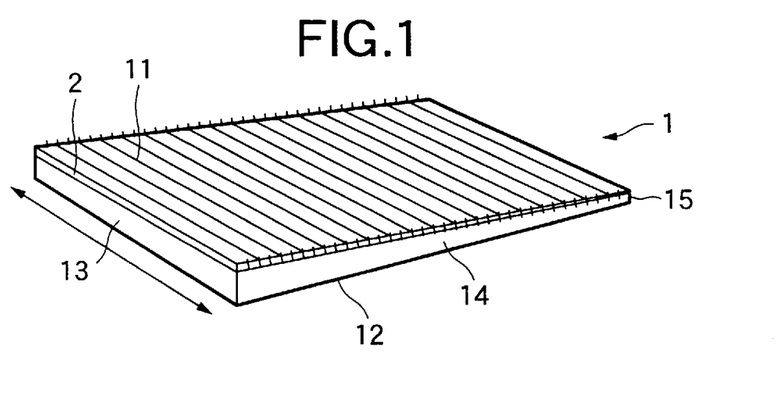
FIG. 1 is a perspective view for explaining a light pipe according to the present invention.
Figure 2A:
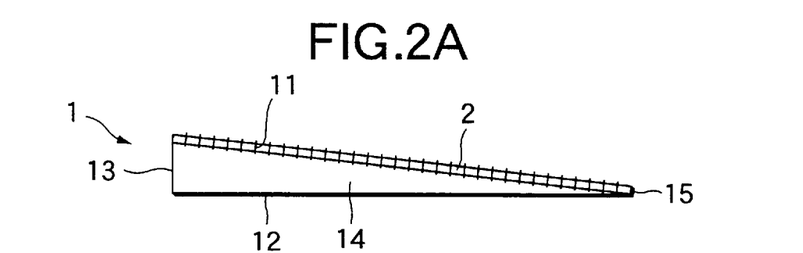
FIGS. 2A through 2C are side views for explaining another light pipe according to the present invention.
Figure 3A:
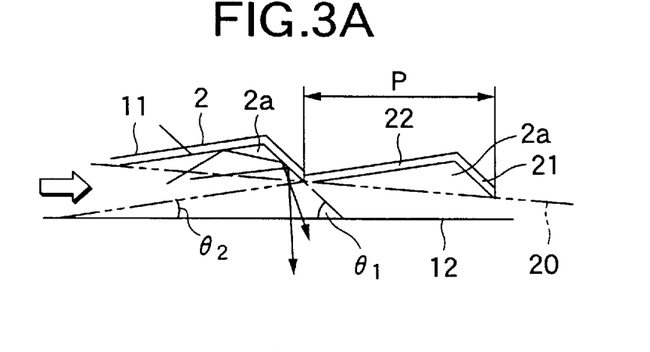
FIGS. 3A and 3B are side views for explaining prism-like irregularities.
Figure 3B:
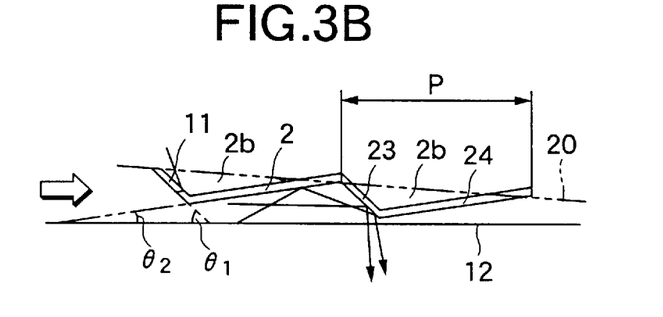

Thinning the opposite end permits light incident on the incident side surface as shown by the big arrow in FIGS. 3 and 4 to enter efficiently the light output means formed on the upper surface until the light reaches the opposite end. Hence, there is an advantage in that the incident light is outputted from the lower surface through reflection, or the like, so that the incident light can be supplied to a target surface efficiently. There is further an advantage in that the weight of the light pipe can be lightened. Incidentally, when the upper surface is provided as a linear surface as shown in FIG. 2A, the weight of the light pipe can be reduced to about 75% compared with the weight of a light pipe of uniform thickness.

Any light pipe may be used so long as the light pipe can exhibit the aforementioned output characteristic. Hence, the light output means provided on the upper surface of the plate-like material may be made of a suitable material exhibiting such characteristic. The preferred from the point of view of the degree of achievement of the aforementioned characteristic, etc. is a light output means constituted by prism-like irregularities.

The prism-like irregularities may be formed from convex or concave portions each having equal-angle surfaces. From the point of view of light utilizing efficiency, etc., the prism-like irregularities is preferably formed from convex or concave portions each having a short side surface and a long side surface. Examples of the prism-like irregularities are shown in FIGS. 3A and 3B. The reference numeral 2a designates a convex portion; 2b, a concave portion; 21 or 23, a short side surface; and 22 or 24, a long side surface. Incidentally, the distinction between the convex portions and the concave portions is determined by referring to a straight line connecting intersection points between the short and long side surfaces and a surface for forming the short and long side surfaces, that is, the distinction is determined on the basis of the fact as to whether intersection points (vertices) between the short side surfaces and the long side surfaces are protruded or sunken from the straight line.

That is, in the case based on the example shown in FIG. 3, a straight line 20 expressed by a virtual line connecting intersection points between the short and long side surfaces (21 and 22, or 23 and 24) for forming the convex or concave portions 2a or 2b and a surface for forming the short and long side surfaces is referred to so that the distinction is determined on the basis of the fact as to whether intersection points (vertices) between the short and long side surfaces are protruded or sunken from the straight line 20.

The light pipe according to the present invention is configured so that the direction $\theta_3$ of the largest intensity A of the light outputted from the lower surface 12 with respect to light (big arrow) incident on the incident side surface 13 as shown in FIG. 4 is within 30 degrees to a normal line H with respect to a reference plane of the lower surface and that the largest intensity of light leaking from the upper surface in the direction within 30 degrees is not larger than 1/5 as large as the largest intensity A at the lower surface.

The light leaking from the upper surface is apt to overlap the reflected light, through a reflection layer, of the light exhibiting the largest intensity A. When the ratio of the largest intensity of the light leaking from the upper surface to the largest intensity of the light outputted from the lower surface is high, the strength of a display image is apt to be relatively reduced so that contrast is apt to be lowered.

The light pipe preferred from the point of view of improvement of display quality such as brightness and contrast in the case where the light pipe is used for forming a reflection type liquid-crystal display device is configured so that the direction $\theta_3$ is within 28 degrees, especially within 25 degrees, more especially within 20 degrees in a plane (section in FIG. 4) perpendicular to both reference planes of the incident side surface 13 and the lower surface 12 as shown in FIG. 4.

In addition, the preferred light pipe is configured so that the intensity of light a leaking from the upper surface 11 at the same angle $\theta_3$ as the direction of the largest intensity A in the case where the incident side surface 13 side is set as a negative direction with reference to the normal line H takes a value which is as small as possible and which is not larger than 1/10, especially not larger than 1/15, more especially not larger than 1/20 as large as the largest intensity A. Because the leaking light a overlaps the positive reflecting direction of the light exhibiting the largest intensity A, the strength of the display image is relatively reduced to thereby lower contrast when the value of the ratio a/A is large.

The light output means preferred from the point of view of achievement of the direction of the largest intensity and the ratio of the leaking light intensity to the largest intensity, etc. is constituted by a repetitive structure of arrangement of prism-like irregularities (2a or 2b) each having a short side surface ($\theta_1$) with an inclination angle in a range of from 30 to 40 degrees and a long side surface ($\theta_2$) with an inclination angle in a range of from 0 to 10 degrees to the reference plane of the lower surface 12 as shown in FIG. 3.

In the above description, each short side surface 21 or 23 formed as a slope inclined down from the incident side surface (13) side toward the opposite end (15) side has a role of reflecting a light part incident on the short side surface among the light incident on the side surface to supply the light part to the lower surface (light output surface). In this case, when the inclination angle $\theta_1$ of the short side surface is set to be in a range of from 30 to 45 degrees, the short side surface can reflect the transmission light so efficiently as to be perpendicular to the lower surface as shown by the polygonal-line arrow in FIG. 3. As a result, the light outputted from the lower surface can be obtained as light exhibiting the direction $\theta_3$ of the largest intensity A within 30 degrees to the normal line H with respect to the lower surface as shown in FIG. 4.

The preferred inclination angle $\theta_1$ of the short side surface from the point of view of the aforementioned performance such as suppression of leaking light, suppression of visibility disturbance owing to the leaking light, etc. is in a range of from 32 to 43 degrees, especially in a range of from 35 to 42 degrees. Incidentally, if the inclination angle $\theta_1$ of the short side surface is smaller than 30 degrees, the direction of the largest intensity of the light outputted from the lower surface forms a large angle to the normal line so that brightness is apt to be lowered because of reduction of the quantity of light allowed to be used for visual recognition. If the inclination angle $\theta_1$ of the short side surface is larger than 45 degrees, the quantity of light leaking from the upper surface is apt to increase.

On the other hand, each long side surface has the double purpose of reflecting the transmission light incident on the long side surface to supply the transmission light to a corresponding short side surface and transmitting a display image from a liquid-crystal cell in the case where the light pipe is used for forming a reflection type liquid-crystal display device. From this point of view, the inclination angle $\theta_2$ Of the long side surface to the reference plane (12) of the lower surface is preferably set to be in a range of from 0 to 10 degrees.

From the above description, the transmission light with an angle larger than the inclination angle $\theta_2$ is incident on the long side surface 22 or 24 and reflected as shown by the polygonal-line arrow in FIG. 3. In this case, the light is reflected to be more parallel to the lower surface 12 on the basis of the inclination angle of the long side surface. The reflected light enters the short side surface 21 or 23 and is reflected by the short side surface. As a result, the light exits from the lower surface 12 while the light is converged by the aforementioned paralleling operation.

As a result of the above description, the transmission light incident on the short side surface through incidence on the long side surface and reflection at the long side surface in addition to the transmission light directly incident on the short side surface can be supplied to the lower surface by reflection through the short side surface. Improvement of light utilizing efficiency can be attained correspondingly. At the same time, the incidence angle of light incident on the short side surface through reflection at the long side surface can be kept constant. As a result, variations of the reflection angle can be suppressed, so that collimation and condensation of the light outputted from the short side surface can be attained. Hence, directivity can be given to the output light by adjustment of the respective inclination angles of the short and long side surfaces. Hence, light can be outputted at an angle perpendicular to the lower surface or at an angle near to the perpendicular angle.

If the inclination angle $\theta_2$ of the long side surface is 0 degrees, the effect of collimating the transmission light is short. If the inclination angle is larger than 10 degrees, the rate of incidence on the long side surfaces is lowered so that light emission is apt to be made ununiform because of shortage of light supplied to the opposite end side. With respect to the sectional shape of the light pipe, it becomes difficult to reduce the opposite end side thickness. Hence, the quantity of light incident on the prism-like irregularities is reduced so that light emitting efficiency is apt to be lowered. The inclination angle $\theta_2$ of the long side surfaces preferred from the point of view-of the aforementioned performance such as condensation of output light, suppression of leaking light, etc., based on collimation of transmission light is not larger than 8 degrees, especially not larger than 5 degrees.

The long side surfaces preferred from the point of view of visual recognition, or the like, of a display image through the long side surfaces of the light pipe are formed so that the angle differences between their inclination angles $\theta_2$ are set to be within 5 degrees, especially within 4 degrees, more especially within 3 degrees as a whole of the light pipe and that the difference between inclination angles $\theta_2$ of adjacent long side surfaces is set to be within 1 degree, especially within 0.3 degrees, more especially within 0.1 degrees.

In this manner, the influence of the difference between inclination angles $\theta_2$ of the long side surfaces permeating light on the display image can be suppressed. If deflection at a transmission angle of each long side surface varies widely in accordance with the place, the display image is apt to be unnatural. Particularly if the difference in deflection between transmission images near to adjacent pixels is large, the display image is apt to be remarkably unnatural.

The aforementioned angle difference between inclination angles $\theta_2$ holds on the premise that the inclination angles $\theta_2$ of the long side surfaces are in a range of from 0 to 10 degrees. That is, the aforementioned angle difference holds on the premise that the inclination angles are set as such small angles $\theta_2$ in an allowable range in order to suppress deflection of the display image owing to refraction at the time of transmission of light through the long side surfaces. This is for the purpose of setting the point of observation in a neighborhood of a vertical direction to prevent the optimum visibility direction of the optimized liquid-crystal display device from being changed.

If the display image is deflected, the optimum visibility direction is shifted from the neighborhood of the vertical direction. Moreover, if the deflection of the display image is large, the optimum visibility direction comes close to the direction of emission of light leaking from the upper surface of the light pipe so that the leaking light may be apt to exert influence such as lowering of contrast on the optimum visibility direction. Incidentally, the condition that the inclination angle $\theta_2$ of each long side surface is in a range of from 0 to 10 degrees includes the influence of diffusion of transmitted light, or the like, is set to be ignorable.

The preferred from the point of view of obtaining a bright display image is a light pipe excellent in efficiency of incidence of external light and excellent in transmittance or output efficiency of an image displayed by the liquid-crystal cell. From this point of view, the light pipe preferably has prism-like irregularities so that the projected area of the long side surfaces on the reference plane of the lower surface is not smaller than 5 times, especially not smaller than 10 times, more especially not smaller than 15 times as large as the projected area of the short side surfaces on the reference plane. Hence, a large part of the image displayed by the liquid-crystal cell can be transmitted through the long side surfaces.

Incidentally, in the case where the image displayed by the liquid-crystal cell is transmitted, the display image incident on the short side surfaces has little influence on the display image through the long side surfaces because the display image is reflected toward the incident side surface side so as not to exit from the upper surface or is deflected in a largely different direction on the end side opposite to the display image transmitted through the long side surfaces with reference to the normal line with respect to the lower surface. Hence, the preferred from this point of view are short side surfaces which are not localized with respect to the pixels of the liquid-crystal cell. Incidentally, in an extreme situation, if the short side surfaces overlap the whole surface of the pixels, the display image can hardly be visually recognized in the neighborhood of the vertical direction through the long side surfaces.

Hence, from the point of view of prevention of unnatural display owing to shortage of transmission of display light, and so on, the area of overlap of the short side surfaces with the pixels is preferably reduced to secure sufficient transmittance of light through the long side surfaces. From the aforementioned point of view, the short side surfaces are preferably formed so that the projected width of the short side surfaces on the reference plane of the lower surface is not larger than 40 $\mu$m, especially in a range of from 1 to 20 $\mu$m, more especially in a range of from 5 to 15 $\mu$m considering that the pixel pitch of the liquid-crystal cell is generally in a range of from 100 to 300 $\mu$m.

It is also preferable from the aforementioned point of view that the distance between adjacent short side surfaces is large. On the other hand, if the distance is too large, illumination in a lighting mode may become sparse to cause still unnatural display because the short side surfaces form a functional portion for substantially outputting light incident on the side surface. Considering these, the repetitive pitch P of a prism-like irregularity 2a or 2b is preferably set to be in a range of from 50 $\mu$m to 1.5 mm as shown in FIG. 3. Incidentally, the pitch may be a regular pitch or may be an irregular pitch such as a random pitch, a combination of a predetermined number of pitch units at random or regularly, etc.

When the light output means is constituted by prism-like irregularities, the light output means may interfere with the pixels of the liquid-crystal cell to cause moire. Although prevention of moire can be performed by adjustment of the pitch of the prism-like irregularities, the pitch of the prism-like irregularities is limited to the preferred range as described above. Hence, measures against moire generated in the pitch range are a subject of discussion.

In the present invention, there is preferably used a method in which the prism-like irregularities are formed to be inclined with respect to the reference plane of the incident side surface so that the prism-like irregularities are arranged to cross the pixels to thereby prevent moire. In this case, if the inclination angles are too large, deflection occurs in reflection through the short side surfaces. Hence, large polarization occurs in the direction of output light. Hence, anisotropy of emission intensity in the light-transmitting direction of the light pipe becomes large. Hence, light-utilizing efficiency is also reduced. This is apt to be a cause of lowering of display quality.

From the aforementioned point of view, the direction of arrangement of the prism-like irregularities with respect to the reference plane of the incident side surface, that is, the inclination angle in the ridgeline direction of the prism-like irregularities is preferably set to be within ±30 degrees, especially within ±25 degrees, more especially within ±20 degrees. Incidentally, the symbol "±" means the direction of inclination with reference to the incident side surface. When moire can be ignored, it is more preferable that the direction of arrangement of the prism-like irregularities is set to be as parallel to the incident side surface as possible.

Figure 2B:
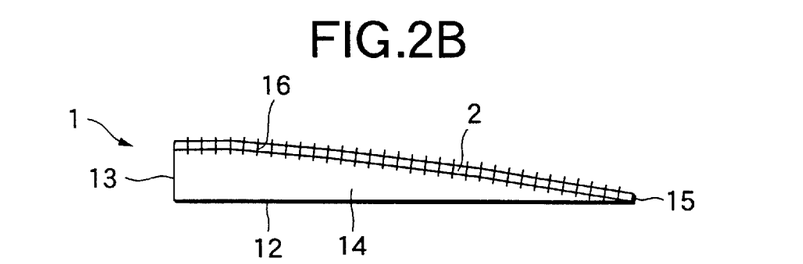
Figure 2C:
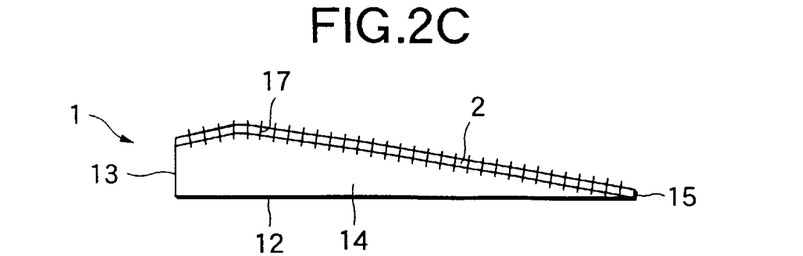

The light pipe can be provided as a suitable form as described above. Also in the case where the light pipe is shaped like a wedge, or the like, the shape can be determined suitably. The surface shape of the light pipe can be set as a suitable surface shape such as a linear surface 11 as shown in FIG. 2A, a curved surface 16 or 17 as shown in FIG. 2B or FIG. 2C, or the like.

Also the prism-like irregularities constituting the light output means need not be formed from linear surfaces 21, 22, 23 and 24 shown in FIG. 3. The surface shape of each of the prism-like irregularities may be provided as a suitable surface shape including a bent surface, a curved surface, etc. Further, the prism-like irregularities may be constituted by a combination of irregularities different in shape, etc. in addition to pitch. Further, the prism-like irregularities may be formed as a series of convex or concave portions arranged continuously in terms of ridgeline or may be formed as convex or concave portions arranged discontinuously at predetermined intervals intermittently in terms of ridgeline direction.

As shown in the drawings, a hard coat layer 2 is provided on the upper surface of the light pipe. The hard coat layer is provided for the purpose of keeping on the aforementioned light output characteristic for a long term by preventing the light output means formed on the upper surface from being injured or abraded by wiping-out, or the like. Therefore, the hard coat layer can be formed as a suitable transparent hard film by a suitable forming method in accordance with the background art, such as a vapor deposition film made of a glass material such as silicon dioxide, zirconia etc., especially made of a hard glass material, a coating film of a hard polymer such as a silicone polymer, a fluorine polymer, etc., and so on. The material of the hard coat layer is not particularly limited.

Also the thickness of the hard coat layer is not particularly limited. Generally, from the point of view of practical use, etc., the thickness is set to be not larger than 3 $\mu$m, especially not larger than 2 $\mu$m, more especially in a range of from 0.1 to 1 $\mu$m. When the light output means is constituted by prism-like irregularities, it is preferable that the hard coat layer has the aforementioned thickness, from the point of view of the shape characteristic, etc. thereof.

The shape of the lower surface of the light pipe and the shape of the incident side surface thereof are not particularly limited and may be determined suitably. Generally, the lower surface is formed as a flat surface and the incident side surface is formed as a surface perpendicular to the lower surface. Incidentally, with respect to the lower surface, the light output means may interfere with reflection patterns of the light output means in the lower surface to thereby form interference fringes in accordance with the direction of visual recognition when viewed from the upper surface. Therefore, if necessary, the lower surface may be formed to have a fine irregular structure for the purpose of preventing lowering of display quality from being caused by the moire phenomenon. The fine irregularities can be formed by a suitable method in accordance with the background-art diffusing layer, such as a method of roughening the lower surface of the light pipe, a method of providing a transparent fine particle-containing resin layer or diffusing sheet to the lower surface of the light pipe, and so on.

Also with respect to the incident side surface, for example, it may be shaped like a curved concave in accordance with the outer circumference of the light source, or the like, to attain improvement of light incidence efficiency. Further, the incident side surface may be formed as an incident side surface structure having an introducer portion interposed between the light source and the incident side surface. The shape of the introducer portion can be formed as a suitable shape in accordance with the shape of the light source.

In the above description, the light pipe preferred from the point of view of prevention of lowering of visibility characteristic caused by disorder of a display image owing to scattering, achievement of a clear display image, etc. is a light pipe in which the total light-rays transmittance of incident light in directions of the upper and lower surfaces, especially the total light-rays transmittance of perpendicular incident light from the lower surface to the upper surface is not lower than 90%, especially not lower than 92%, more especially not lower than 95% and in which haze is not higher than 45%, especially not higher than 30%, more especially not higher than 20%.

The light pipe may be made of a suitable material exhibiting transparency in accordance with the wavelength range of the light source. Incidentally, when the wavelength range is a visible light range, transparent resin, as represented by acrylic resin, polycarbonate resin, epoxy resin, or the like, glass, etc. may be used. A light pipe made of a material not exhibiting birefringence or small in birefringence is used preferably.

The light pipe may be also formed by a cutting method and may be formed by a suitable method. Examples of the producing method preferred from the point of view of mass-production, etc. are a method of transferring a shape by pressing a thermoplastic resin against a mold capable of forming a predetermined shape under heating, a method of filling a mold capable of forming a predetermined shape with a hot-melted thermoplastic resin or with a resin fluidized through heat or solvent, a method of performing polymerization by filling a mold capable of forming a predetermined shape with a liquid resin polymerizable by heat, ultraviolet light, radiation, or the like, or by casting the liquid resin into the mold, and so on.

Incidentally, the light pipe according to the present invention may be formed as a laminate of parts made of the same kind or different kinds of materials such as a laminate of a sheet having a light output means constituted by prism-like irregularities and a light guide portion being in charge of light transmission and adhesively bonded to the sheet. That is, the light pipe need not be formed as an integrated monolayer structure made of one kind of material. The thickness of the light pipe can be determined suitably in accordance with the size of the light pipe, the size of the light source, etc. in accordance with the purpose of use. The general thickness in the case where the light pipe is used for forming a reflection type liquid-crystal display device is not larger than 20 mm, especially in a range of from 0.1 to 10 mm, more especially in a range of from 0.5 to 8 mm in terms of the thickness of the incident side surface.

In the light pipe according to the present invention, light incident on the upper and lower surfaces is transmitted the lower or upper surfaces sufficiently. Various devices such as a surface light source device utilizing such light emitted from the light source so efficiently as to be excellent in brightness, a reflection type liquid-crystal display device which is bright and easy to watch and which is excellent in power saving, and so on, can be formed by use of the light pipe because accurately collimated light can be output in a direction excellent in perpendicular characteristic advantageous in visual recognition.

Figure 5:
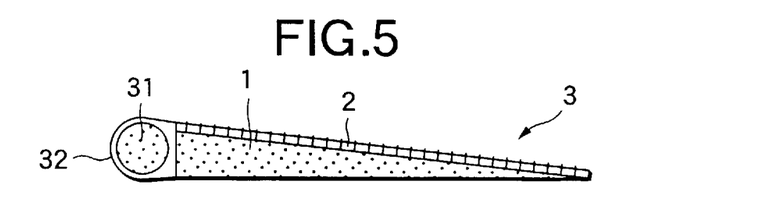
FIG. 5 is a side sectional view of a surface light source device.

FIG. 5 shows a surface light source device 3 having the light pipe 1 according to the present invention. For example, the surface light source device can be formed by arrangement of a light source 31 on the incident side surface of the light pipe 1 as shown in FIG. 5. The surface light source device can be preferably used as a side-light type front-lighting unit, or the like.

A suitable light source may be used as the light source disposed on the incident side surface of the light pipe. Generally, for example, a linear light source such as a (cold-or hot-) cathode tube, a point light source such as a light-emitting diode, an array light source having arrangement of linear or point light sources in a line or plane, a light source using a device for converting a point light source into a state of linear emission of light at regular or irregular intervals, and so on, may be used preferably. From the point of view of power saving, durability, etc., the cold-cathode tube is especially preferably used.

Figure 6:
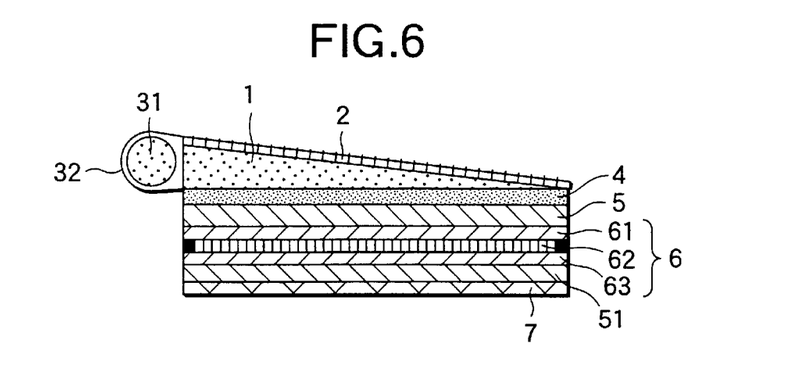
FIG. 6 is a side sectional view of a reflection type liquid-crystal display device.

The surface light source device may be formed as a combination body in which suitable auxiliary means such as a light-source holder 32 for enclosing the light source to lead light scattered from the light source 31 to the incident side surface of the light pipe 1 as shown in FIG. 5, a diffusing layer 4 disposed on the lower surface of the light pipe to obtain uniform surface light emission as shown in FIG. 6, and so on, are disposed as occasion demands.

A resin sheet coated with a high-reflectance metal thin film or a sheet of metal foil, or the like, is generally used as the light source holder. When the light source holder is bonded to an end portion of the light pipe through an adhesive agent, or the like, the formation of the light output means in the adhesive portion may be omitted.

The diffusing layer is disposed on the light output surface of the surface light source device, that is, on the lower surface 12 of the light pipe 1 in advance as occasion demands for the purpose of uniformity of brightness by preventing brightness irregularity, reduction of moire by mixing adjacent light rays, etc. In the present invention, a diffusing layer having an arrow diffusing range is preferably used from the point of view of preservation of directivity of output light of the light pipe, light-utilizing efficiency, etc.

The diffusing layer can be formed by a suitable method, for example, such as a method of applying and hardening high-refractive-index transparent particles dispersed into a low-refractive-index transparent resin in accordance with the fine irregularities of the lower surface, a method of applying and hardening a transparent resin having air bubbles dispersed therein, a method of crazing a surface of a substrate by swelling out the surface through a solvent, a method of forming a transparent resin layer having an irregular rough surface or a method using a diffusing sheet formed in the same manner as described above. The method for forming the diffusing layer is not particularly limited. The aforementioned irregular rough surface may be formed by a suitable method such as a mechanical or/and chemical treatment method of transferring a rough surface shape of a roll, a mold, or the like, subjected to a surface-roughening treatment onto a surface of a substrate or a surface of a transparent resin coating layer provided on the substrate.

As described above, the surface light source device according to the present invention provides light which is excellent in light-utilizing efficiency and which is bright and excellent in perpendicular characteristic. The surface light source device is also easy to increase the area thereof. Therefore, the surface light source device can be preferably applied to various devices. For example, the surface light source device can be used as a front-lighting system for a reflection type liquid-crystal display device. Hence, a power-saving reflection type liquid-crystal display device which is bright and easy to watch, or the like, can be obtained.

Figure 7:
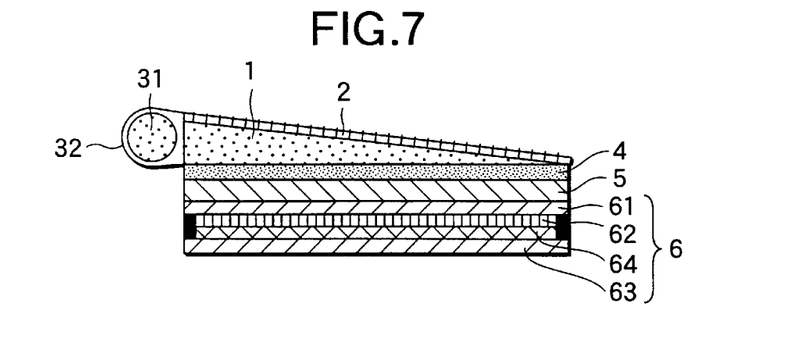
FIG. 7 is a side sectional view of another reflection type liquid-crystal display device.

FIGS. 6 and 7 show examples of the reflection type liquid-crystal display device using the surface light source device 3 according to the present invention as a front-lighting system. The reference numerals 5 and 51 designate polarizing plates; 6, a liquid-crystal cell; 61 and 63, cell substrates; 62, a liquid-crystal layer; and 7 and 64, reflection layers. The reflection type liquid-crystal display device can be formed by arrangement of the liquid-crystal cell 6 having a reflection layer 7 or 64 on the light output side of the surface light source device as shown in the drawings, that is, on the lower surface side of the light pipe 1 in the surface light source device.

The reflection type liquid-crystal display device is generally formed by assembling constituent parts such as a liquid-crystal cell having a transparent electrode serving as a liquid-crystal shutter, a drive unit attached to the liquid-crystal cell, a polarizing plate, a front-lighting unit, a reflection layer and a compensatory retarder plate as occasion demands. In the present invention, the reflection type liquid-crystal display device can be formed in accordance with the background art as shown in the drawings without particular limitation except that the aforementioned surface light source device is used. Incidentally, in the example shown in FIG. 6, the transparent electrode is not shown.

Hence, the liquid-crystal cell to be used is not particularly limited. For example, there may be used a suitable liquid-crystal cell such as a TN or STN liquid-crystal cell, a perpendicularly oriented or HAN cell, a twisted or non-twisted cell such as an OCB cell or a guest-host or ferro-electric liquid-crystal cell in terms of the orientation form of the liquid-crystal cell. The liquid-crystal drive method is not particularly limited. For example, there may be used a suitable drive method such as an active matrix method or a passive matrix method.

The arrangement of the reflection layer 7 or 64 is essential to the reflection type liquid-crystal display device. The position of arrangement of the reflection layer, however, may be provided outside the liquid-crystal cell 6 as shown in FIG. 6, or inside the liquid-crystal cell 6 as shown in FIG. 7. The reflection layer may be formed as a suitable reflection layer in accordance with the background art such as a coating layer of a binder resin containing high-reflectance metal powder such as aluminum, silver, gold, copper, chromium, etc., an attachment layer of a metal thin film by a vapor deposition method, or the like, or a reflection sheet or a sheet of metal foil constituted by the coating or attachment layer supported by a substrate.

Incidentally, when the reflection layer 64 is provided inside the liquid-crystal cell 6 as shown in FIG. 7, a reflection layer formed-by a method of forming an electrode pattern from a highly electrically conductive material such as the aforementioned high-reflectance metal or by a method of forming a transparent electrically conductive film, for example, from the transparent electrode-forming material on a transparent electrode pattern is preferably used as the reflection layer.

A suitable material can be used as the polarizing plate. From the point of view of obtaining good contrast-ratio display based on incidence of high-grade linearly polarized light, etc., a material high in the degree of polarization such as an absorption type linearly polarizing element of iodine or dye can be used preferably.

Incidentally, for the formation of the reflection type liquid-crystal display device, suitable optical devices such as a diffusing plate, an anti-glare layer, an anti-reflection film and a protective layer to be provided on the visual side polarizing plate or a compensatory retarder plate to be provided between the liquid-crystal cell and the polarizing plate may be disposed suitably.

The aforementioned compensatory retarder plate is provided for the purpose of compensating for wavelength dependence of birefringence to attain improvement of visibility, etc. In the present invention, one or two compensatory retarder plates can be disposed between the visual side polarizing plate and the liquid-crystal cell or/and between the back side polarizing plate and the liquid-crystal cell as occasion demands. A suitable member may be used as the compensatory retarder plate in accordance with the wavelength range. The compensatory retarder plate may be formed as one layer or as a multilayer laminate constituted-by two or more phase difference layers.

Figure 8:
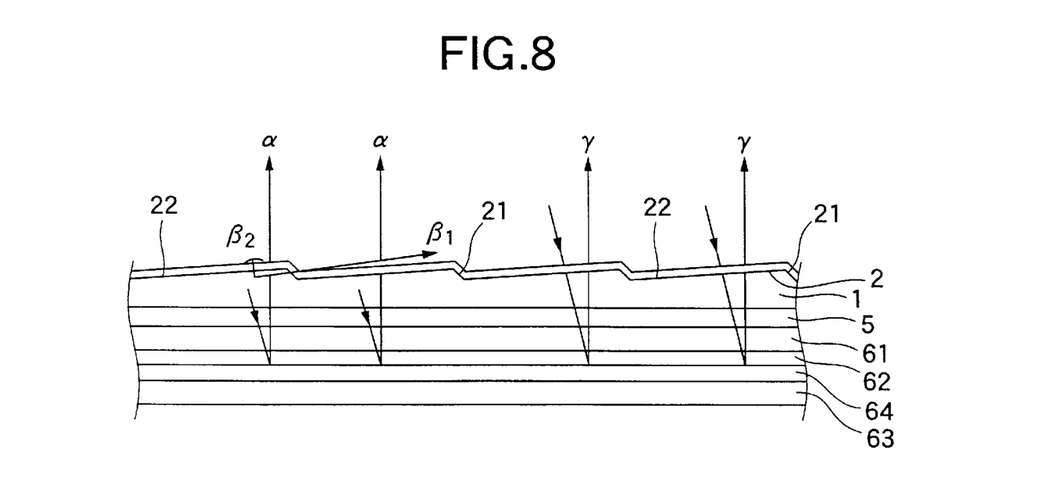
FIG. 8 is a view for explaining a display image according to the embodiment.

Visual recognition of the reflection type liquid-crystal display device according to the present invention is performed through light transmitted through the surface light source device, especially light transmitted through the long side surfaces of the light pipe in the surface light source device. FIG. 8 shows, by way of example, a visual recognition state in the case where the reflection layer 64 is provided inside the liquid-crystal cell. In FIG. 8, when the surface light source device is turned on, light α emitted from the lower surface of the light pipe 1 is reflected through the reflection layer 64 via the polarizing plate 5, the liquid-crystal layer 62, etc. Hence, the light α reaches the light pipe 1 reversely via the liquid-crystal layer, the polarizing plate, etc. As a result, a display image (α) transmitted through the long side surfaces 22 is viewed.

In the aforementioned case, in the present invention, strong leaking light 81 exits in a direction largely angularly divergent from a frontal direction perpendicular to the liquid-crystal cell whereas leaking light $β_2$ exiting in the frontal direction is weak. Hence, a display image excellent in display quality in a neighborhood of the frontal direction through the long side surfaces can be viewed.

On the other hand, also when the surface light source device is turned off so that external light is used, light γ input from the long side surfaces 22 in the upper surface of the light pipe 1 is transmitted through the polarizing plate, the liquid-crystal layer, the reflection layer, etc. in the same manner as described above. Hence, the light γ reaches the light pipe 1 in the reverse course. As a result, a display image (γ) transmitted through the long side surfaces can be viewed in a state in which the display image is so excellent in display quality that disorder, or the like, owing to the light pipe is short in a neighborhood of the frontal direction.

According to the present invention, optical devices or parts for forming the surface light source device or the liquid-crystal display device, such as a light pipe, a diffusing layer, a liquid-crystal cell, a polarizing plate, etc., may be wholly or partly integrally laminated and fixed with one another or may be disposed in a separable state. From the point of view of prevention of lowering of contrast owing to suppression of interface reflection, etc., it is preferable that the optical devices or parts are fixed and that at least the lower surface of the light pipe in the surface light source device is fixed closely to the upper surface of the liquid-crystal cell.

A suitable transparent adhesive agent such as a tackifier can be used for the aforementioned closely fixing process. The aforementioned transparent particles, or the like, may be contained in the transparent adhesive layer so that the adhesive layer can be used as an adhesive layer exhibiting a diffusing function.

EXAMPLE 1

An upper surface of a transparent plate of polymethyl methacrylate (PMMA) was cut by a diamond bite to thereby obtain a plate-like material 80 mm wide and 130 mm deep. The plate-like material had an incident side surface 2 mm thick, an opposite end surface 0.8 mm thick, a lower surface (output surface) provided as a flat surface, an upper surface provided as a nearly planar curved surface (FIG. 2B) protruded upward from the incident side surface to the opposite end surface, and prism-like irregularities arranged at intervals of a pitch of 390 μm on the curved surface so as to be parallel to the incident side surface. Each of the prism-like irregularities had a short side surface, and a long side surface. The respective inclination angles of the short side surfaces changed in a range of from 36.5 to 39 degrees. The respective inclination angles of the long side surfaces changed in a range of from 1.1 to 1.5 degrees. The inclination angle change between adjacent long side surfaces was within 0.1 degrees. The projected width of the short side surfaces on the lower surface was in a range of from 10 to 21 μm. The projected area ratio of the long side surfaces to the short side surfaces on the lower surface was not lower than 17/1. A hard coat layer of $SiO_2$ 0.3 m thick was provided on the upper surface of the plate-like material by a vacuum vapor deposition method.

A cold-cathode tube with a diameter of 2.4 mm was disposed on the incident side surface of the light pipe. An edge of the cold-cathode tube was enclosed in a light source holder made of a polyester film coated with silver by vapor deposition while the edge was brought into close contact with the upper and lower end surfaces of the light pipe. An inverter and a DC power supply were connected to the cold-cathode tube. Thus, a surface light source device was obtained. A monochrome reflection type TN liquid-crystal cell having a reflection sheet similar to the light source holder on its back was disposed on the light output side (the lower surface of the light pipe. Thus, a reflection type liquid-crystal display device was obtained.

Comparative Example

A surface light source device and a reflection type liquid-crystal display device were obtained in the same manner as in Example 1 except that a light pipe having no hard coat layer on its upper surface was used.

Evaluation Test

The following characteristics were examined upon the light pipe, the surface light source device and the reflection type liquid-crystal display device obtained in each of Example and Comparative Example.

Output Intensity

The angle characteristic of output intensity in the upper and lower surfaces in the center portion of the light pipe was examined by a brightness meter (BM7, made by Topcon Corp.) in the condition that the surface light source device was turned on. Measurement was performed while the angle was changed with reference to the direction of a normal line with respect to the lower surface in a plane perpendicular both to the lower surface and to the incident side surface. To make the measurement area constant, the measured value was multiplied by cosine of the measurement angle θ to thereby obtain output intensity at θ. Also the output direction of the maximum intensity was obtained. The maximum intensity and direction thereof in the lower surface and the output intensity (corresponding output intensity) in the upper surface in a mirror symmetric direction with reference to the maximum intensity direction in the lower surface, a normal line and the lower surface were shown in the following Table.

Solid 30-Degrees Light Quantity

A cylindrical jig having a hole with a diameter of 10 mm and an inner surface delustered with black was disposed on a side opposite to an illuminance meter so that the solid angle between the hole and a light-receiving surface of the illuminance meter became 30 degrees. The quantity of light emitted within a solid angle of 30 degrees from the upper and lower surfaces of the surface light source device in a lighting state was examined by use of the jig. The quantity of light and the total light-rays transmittance and haze of the light pipe were shown in the following Table.

Frontal Luminance and Visibility

Frontal luminance and visibility in a while state were examined in a driving state of the reflection type liquid-crystal display device under the condition that the surface light source device was turned on. Results thereof were also shown in the following Table. Incidentally, frontal luminance examined for reference in the same manner as described above in the case where the surface light source device was not disposed was 28 cd/m².

Mar-proofness

In the condition that the surface of the light pipe in the reflection type liquid-crystal display device was rubbed with steel wool, frontal luminance and visibility were examined in the same manner as described above. Results thereof were shown in the following Table.

| | Example 1 | Comparative Example |
|---|---|---|
| Lower side maximum intensity angle (degree) | 16 | 16 |
| Lower side maximum intensity (cd/m²) | 680 | 680 |
| Upper side corresponding output intensity (cd/m²) | 34 | 34 |
| Upper side/lower side corresponding maximum output intensity ratio | 0.050 | 0.050 |
| Lower side solid 30-degrees light quantity (LX) | 14.5 | 14.5 |
| Upper side solid 30-degrees light quantity (LX) | 1.3 | 1.3 |
| Total light-rays transmittance | 92.4 | 92.4 |
| Haze (%) | 7.4 | 7.4 |
| Frontal luminance (cd/m²) | 170 | 170 |
| Visibility | Good | Good |
| Mar-proofness | | |
| Frontal luminance (cd/m²) | 170 | 143 |
| Visibility | Good | White fading |

INDUSTRIAL APPLICABILITY

As described above, according to the present invention, there can be obtained a light pipe in which light outputted from its lower surface is excellent in directivity in a vertical direction and in which light leaking from its upper surface hardly overlaps a display image. The use of the light pipe makes it possible to obtain a surface light source device excellent in light utilizing efficiency. Moreover, it is possible to obtain a reflection type liquid-crystal display device which is excellent in contrast in visual recognition both at the time of non-lighting and at the time of lighting, excellent in brightness of display and excellent in clarity because of the light pipe's suppressing disorder of a display image and which keeps up initial output characteristic and display quality for a long term because a light output means is hardly abraded or injured by wiping-out, or the like.

What is claimed is:

1. A light pipe, comprising:
    an incident side surface on which light is incident;
    an upper surface on which a light output means is formed;
    a lower surface from which the light incident on said incident side surface and through said output means is outputted; and wherein a direction of a largest intensity of the light outputted from said lower surface is within an angle of 30 degrees to a normal line with respect to a reference plane of said lower surface; and a largest intensity of light leaking from said upper surface in a direction within said angle of 30 degrees is not higher than ⅕ as high as said largest intensity of the light outputted from said lower surface; and said light pipe has a hard coat layer on said upper surface so that light incident on said lower surface is transmitted from said upper surface.

2. The surface light source device comprising a light pipe according to claim 1, comprising a light source disposed on the incident side surface of said light pipe.

3. The reflection-type liquid crystal display device comprising a surface light source device according to claim 2, and comprising a liquid-crystal cell provided with a reflection layer and disposed on the lower surface side of said surface light source.

4. A light pipe, comprising:
    an incident side surface on which light is incident;
    an upper surface on which a light output means is formed;
    a lower surface from which the light incident on said incident side surface and through said output means is outputted; and wherein a direction of a largest intensity of the light outputted from said lower surface is within an angle of 30 degrees to a normal line with respect to a reference plane of said lower surface; and a largest intensity of light leaking from said upper surface in a direction within said angle of 30 degrees is not higher than 1/5 as high as said largest intensity of the light outputted from said lower surface; and said light pipe has a hard coat layer on said upper surface so that light incident on said lower surface is transmitted from said upper surface; and wherein: said light output means is constituted by a repetitive structure in which prism-like irregularities each having a short side surface and a long side surface are arranged at intervals of a pitch in a range of from 50 μm to 1.5 mm; each of said short side surfaces is constituted by a slope inclined down from the incident side surface side to the opposite end side with an inclination angle in a range of from 30 to 45 degrees to said reference plane of said lower surface and with a projected width of not larger than 40 μm on said reference plane; and each of said long side surfaces is constituted by a slope which is inclined at an angle in an inclination angle range of from 0 to 10 degrees to said reference plane so that the inclination angle difference between said long side surfaces as a whole is within 5 degrees, that the inclination angle difference between adjacent long side surfaces is within 1 degree and that the projected area of said long side surfaces on said reference plane is not smaller than 5 times as large as the projected area of said short side surfaces on said reference plane.

5. A light pipe according to claim 4, wherein the ridgeline direction of said prism-like irregularities is within an angle range of ±30 degrees to a reference plane of said incident side surface.

6. A surface light source device comprising a light pipe according to claim 4, and comprising a light source disposed on the incident side surface of said light pipe.

7. A reflection type liquid-crystal display device comprising a surface light source device according to claim 4, and comprising a liquid-crystal cell provided with a reflection layer and disposed on the lower surface side of said surface light source.

8. The surface light source device comprising a light pipe according to claim 5, comprising a light source disposed on the incident side surface of said light pipe.

9. The reflection-type liquid crystal display device comprising a surface light source device according to claim 8, and comprising a liquid-crystal cell provided with a reflection layer and disposed on the lower surface side of said surface light source.

10. A light pipe, comprising:

an incident side surface on which light is incident;

an upper surface on which a light output means is formed;

a lower surface from which the light incident on said incident side surface and through said output means is outputted;

wherein said light pipe has a hard coat layer on said upper surface so that light incident on said lower surface is transmitted from said upper surface; and wherein said light output means is constituted by a repetitive structure in which prism-like irregularities, each having a short side surface and a long side surface, are arranged at intervals of a pitch in a range of from 50 μm to 1.5 mm;

each of said short side surfaces is constituted by a slope inclined down from the incident side surface side to the opposite end side with an inclination angle in a range of from 30 to 45 degrees to a reference plane of said lower surface and with a projected width of not larger than 40 μm on said reference plane; and each of said long side surfaces is constituted by a slope which is inclined at an angle in an inclination angle range of from 0 to 10 degrees to said reference plane so that the inclination angle difference between said long side surfaces as a whole is within 5 degrees, that the inclination angle difference between adjacent long side surfaces is within 1 degree and that the projected area of said long side surfaces on said reference plane is not smaller than 5 times as large as the projected area of said short side surfaces on said reference plane.

* * * * *